F. BALLOU.
STEAM-PIPE AND BOILER-COVERING.
No. 173,436. Patented Feb. 15, 1876.
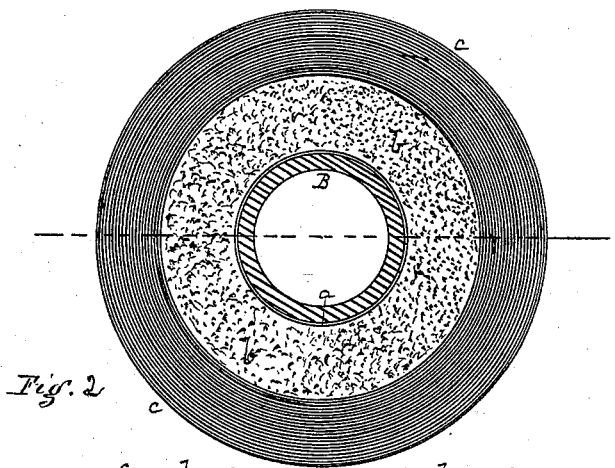
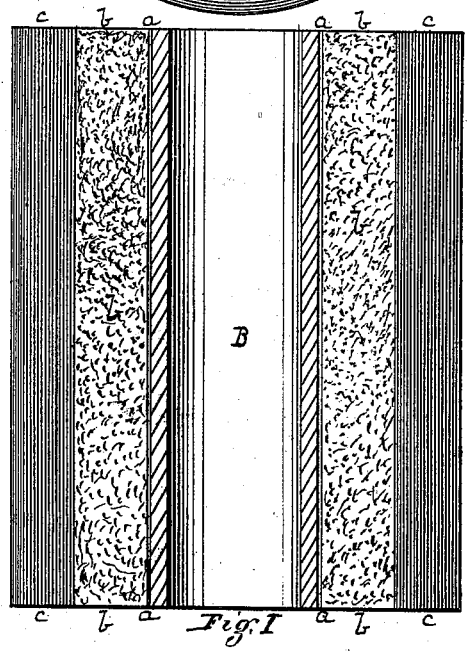

UNITED STATES PATENT OFFICE.

FRANK BALLOU, OF ALLEGHENY, PENNSYLVANIA.

IMPROVEMENT IN STEAM PIPE AND BOILER COVERINGS.

Specification forming part of Letters Patent No. 173,436, dated February 15, 1876; application filed November 18, 1875.

*To all whom it may concern:*

Be it known that I, FRANK BALLOU, of Allegheny, county of Allegheny, State of Pennsylvania, have invented or discovered a new and useful Improvement in Steam Pipe and Boiler Coverings; and I do hereby declare the following to be a full, clear, concise, and exact description thereof, reference being had to the accompanying drawing, making a part of this specification, in which—like letters indicating like parts—

Figure 1 is a longitudinal section of a pipe having my improved covering, and Fig. 2 is a transverse section thereof.

It has long been common to coat steam and hot water and air pipes, boilers, &c., with cement, as a means of preventing, to a greater or less degree, the loss or escape of heat. Such cement has sometimes to be applied to such pipes while they are hot, and, on account of the sudden and rapid vaporization of the water in the cement, it has been found somewhat difficult to get the cement to harden into a solid coating without blow-holes, cracks, or other imperfections; also, the cement, after it does harden, is liable, from various causes, to crumble and break off.

The object of my improvement is to remedy these defects. To this end I wrap the pipe B, before applying the cement, with one or more wrappings of paper, $a$, and for this purpose any quality of paper possessing sufficient body and tenacity of fiber to be coated with paste or other adhesive material may be employed. The paper, being so coated, is wrapped around the pipe, so as to adhere thereto, a single wrapping commonly being sufficient. A coating of cement, $b$, of one-half inch in thickness, more or less, is then applied to the pipe, in any convenient way. The kind of cement is not material, that known as asbestus cement being what I prefer. Outside the cement I wrap one or more coatings of paper, $c$, of any desired quality, as before; but, in order that it may effectually prevent the breaking and crumbling away of the cement within, I prefer to apply several thicknesses of paper, so as to make an exterior wrapping of, say, half an inch in thickness, more or less. I also find that the heat-radiating power of paper is so low that such an exterior coating adds materially to the efficiency of the covering as a preventive of loss or escape of heat.

This exterior paper wrapping may be applied with paste or other adhesive material, so as to make the successive folds adhere together and form an almost solid covering; or such adhesive material may be omitted.

The interior paper wrapping prevents the rapid and sudden vaporization of the water of the cement, so that I am enabled to apply the cement without difficulty and with rapidity, with a good job as the result.

The same improvement may be applied in like manner to the otherwise exposed parts of steam-boilers, or other metallic conduits or receptacles subject to the action of interior heat, with like beneficial results.

I claim as my invention—

1. A paper wrapping, $a$, applied directly onto the heated conduit or receptacle, in combination therewith, and with the cement covering applied directly on the paper, substantially as set forth.

2. In combination with the interior paper wrapping $a$ and the cement covering, applied as described, the exterior paper wrapping $c$, substantially as set forth.

In testimony whereof I have hereunto set my hand.

FRANK BALLOU.

Witnesses:
JNO. A. WILSON,
G. H. CHRISTY.